United States Patent
Xu et al.

(10) Patent No.: US 9,362,835 B2
(45) Date of Patent: Jun. 7, 2016

(54) RESONANT POWER CONVERSION APPARATUS AND CONTROLLING METHOD THEREOF

(71) Applicants: FSP-Powerland Technology Inc., Nanjing (CN); FSP TECHNOLOGY INC., Taoyuan County (TW)

(72) Inventors: Ming Xu, Nanjing (CN); Fei-Yue Duan, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 81 days.

(21) Appl. No.: 14/460,381

(22) Filed: Aug. 15, 2014

(65) Prior Publication Data

US 2015/0109830 A1 Apr. 23, 2015

(30) Foreign Application Priority Data

Oct. 17, 2013 (CN) .......................... 2013 1 0487086

(51) Int. Cl.
*H02M 3/335* (2006.01)
*H02M 1/00* (2006.01)

(52) U.S. Cl.
CPC .. *H02M 3/33569* (2013.01); *H02M 2001/0058* (2013.01); *Y02B 70/1433* (2013.01); *Y02B 70/1491* (2013.01)

(58) Field of Classification Search
CPC . H02M 3/28; H02M 3/33569; H02M 3/3376; H02M 3/33507; H02M 7/53871; Y02B 70/1433

USPC .............. 363/15, 16, 17, 21.02, 21.03, 97–98
See application file for complete search history.

(56) References Cited

U.S. PATENT DOCUMENTS

| 2012/0163037 A1* | 6/2012 | Hong | H02M 3/3387 363/21.02 |
| 2013/0016534 A1* | 1/2013 | Ishikura | H02M 3/337 363/21.02 |
| 2013/0336017 A1* | 12/2013 | Uno | H02M 3/33507 363/21.02 |

FOREIGN PATENT DOCUMENTS

CN 101867296 12/2012

OTHER PUBLICATIONS

"Office Action of Taiwan Counterpart Application", issued on May 25, 2015, p. 1-p. 4.

* cited by examiner

*Primary Examiner* — Nguyen Tran
(74) *Attorney, Agent, or Firm* — Jianq Chyun IP Office

(57) ABSTRACT

A resonant power conversion apparatus and a controlling method of the resonant power conversion apparatus are provided. The resonant power conversion apparatus includes a switch-based resonant converter and a controller. The switch-based resonant converter is configured to supply power to a load. The controller is coupled to the switch-based resonant converter and the load and configured to control switching of the switch-based resonant converter to regulate power conversion of the switch-based resonant converter. The controller has a voltage control loop and a current control loop. The controller detects a driving state of the load and enables one of the voltage control loop and the current control loop according to the detection result to adjust a switching frequency of the switch-based resonant converter.

13 Claims, 8 Drawing Sheets

RESONANT POWER CONVERSION APPARATUS AND CONTROLLING METHOD THEREOF

CROSS-REFERENCE TO RELATED APPLICATION

This application claims the priority benefit of China application serial no. 201310487086.0, filed on Oct. 17, 2013. The entirety of the above-mentioned patent application is hereby incorporated by reference herein and made a part of this specification.

BACKGROUND OF THE INVENTION

1. Field of Invention

The invention relates to a power conversion technique and more particularly to a resonant power conversion apparatus and a controlling method thereof.

2. Description of Related Art

The development trend of direct current (DC) converters, similar to that of most power supply products, is toward high efficiency, high power density, high reliability, and low costs. Since resonant converters (e.g., LLC resonant converters, etc.) are capable of performing zero-voltage switching (ZVS) in the primary winding and zero-current switching (ZCS) in the secondary winding on the full-load range, the resonant converters have gradually been applied as DC converters in recent years.

In a resonant power conversion apparatus using the resonant converter, the over-current protection is a crucial issue. In general, the resonant circuit may produce significant resonant current on the condition of over-load or short-circuit of the load. If the resonant current is not limited or protected, the resonant power conversion apparatus is very likely to be damaged by high current.

In order to provide the over-current protection to the resonant power conversion apparatus, the switching frequency of the resonant converter may be increased to raise the impedance of the resonant circuit according to the related art, and thereby the current can be limited. However, while said over-current protection mechanism is activated, the switching frequency of the resonant converter is far higher than the normal frequency, thus leading to increase of switching loss of the resonant converter. In addition, the stress tolerated by the magnetic components (e.g., capacitors or inductors) may be increased together with the increase of the switching frequency, and thus the magnetic components are more likely to be worn out.

In addition, the increasing switching frequency leads to the rising temperature of operating circuits, and hence the heat dissipation requirement for the resonant power conversion apparatus becomes rather difficult to comply with. Moreover, in order to make sure that the resonant converter may function as normal in case of high frequency, the magnetic components need be enlarged to satisfy the high frequency operational requirement.

SUMMARY OF THE INVENTION

The invention provides a resonant power conversion apparatus and a controlling method thereof which may limit a current flowing through a load by lowering a switching frequency of a resonant converter.

A resonant power conversion apparatus described in an embodiment of the invention includes a switch-based resonant converter and a controller. The switch-based resonant converter is configured to supply power to a load. The controller is coupled to the switch-based resonant converter and the load and configured to control switching of the switch-based resonant converter to regulate power conversion of the switch-based resonant converter. The controller has a voltage control loop and a current control loop. The controller detects a driving state of the load and enables one of the voltage control loop and the current control loop according to a result of detecting the driving state of the load to adjust a switching frequency of the switch-based resonant converter.

According to an embodiment of the invention, the controller detects a load current that flows through the load and a driving voltage that is applied to the load. When the controller determines the load current is smaller than a predetermined current, the controller enables the voltage control loop to adjust the switching frequency of the switch-based resonant converter according to the driving voltage. When the controller determines the load current is larger than or equal to the predetermined current, the controller enables the current control loop to adjust the switching frequency of the switch-based resonant converter according to the load current.

According to an embodiment of the invention, when the voltage control loop is enabled, the controller raises the switching frequency in response to an increase in the driving voltage. When the current control loop is enabled, the controller lowers the switching frequency in response to an increase in the load current.

According to an embodiment of the invention, the controller includes a voltage comparator, a first proportional regulator, a current comparator, a second proportional regulator, and a loop selecting circuit. The voltage comparator is configured to compare the driving voltage with a reference voltage and generate a voltage error signal according to a result of comparing the driving voltage with the reference voltage. The first proportional regulator is coupled to the voltage comparator. Besides, the first proportional regulator is configured to regulate the voltage error signal and accordingly generates a first regulating signal. The current comparator is configured to compare the load current with a reference current and generate a current error signal according to a result of comparing the load current with the reference current. The second proportional regulator is coupled to the current comparator. Besides, the second proportional regulator is configured to regulate the current error signal and accordingly generates a second regulating signal. The loop selecting circuit is coupled to the first proportional regulator and the second proportional regulator. Besides, the loop selecting circuit is configured to generate a switching frequency signal according to one of the first regulating signal and the second regulating signal. The voltage comparator, the first proportional regulator, and the loop selecting circuit constitute the voltage control loop; the current comparator, the second proportional regulator, and the loop selecting circuit constitute the current control loop.

According to embodiment of the invention, the loop selecting circuit includes selection switch and a voltage controlling oscillator. The selection switch is coupled to the first proportional regulator and the second proportional regulator. Besides, the selection switch is controlled by an over-current determining signal to select one of the first regulating signal and the second regulating signal as a control signal, and the over-current determining signal is associated with a result of comparing the load current with the predetermined current. The voltage controlling oscillator is coupled to the selection switch. Besides, the voltage controlling oscillator receives the control signal and accordingly generates the switching frequency signal, and a frequency of the switching frequency signal is associated with the switching frequency of the switch-based resonant converter.

According to embodiment of the invention, the loop selecting circuit includes a first voltage controlling oscillator and a second voltage controlling oscillator. The first voltage controlling oscillator and the second voltage controlling oscillator are respectively coupled to the first proportional regulator and the second proportional regulator. The first voltage controlling oscillator receives the first regulating signal and accordingly generates a first frequency signal. The second voltage controlling oscillator receives the second regulating signal and accordingly generates a second frequency signal. The loop selecting circuit selects one of the first frequency signal and the second frequency signal as the switching frequency signal according to an over-current determining signal. Here, the over-current determining signal is associated with a result of comparing the load current with the predetermined current.

According to embodiment of the invention, the controller further includes a first amplitude limiting circuit and a second amplitude limiting circuit. The first amplitude limiting circuit is coupled between the first proportional regulator and the loop selecting circuit and configured to limit amplitude of the first regulating signal. The second amplitude limiting circuit is coupled between the second proportional regulator and the selection switch and configured to limit amplitude of the second regulating signal. Here, the loop selecting circuit generates the switching frequency signal according to one of the first regulating signal and the second regulating signal after the amplitude of the first regulating signal and the amplitude of the second regulating signal are limited.

According to an embodiment of the invention, the controller further includes a pulse width modulation (PWM) generator. The PWM generator is coupled to the loop selecting circuit and configured to control the switching of the switch-based resonant converter through generating at least one PWM signal according to the switching frequency signal.

According to an embodiment of the invention, the switch-based resonant converter includes a bridge switching circuit, a resonant and transforming circuit, a rectifying and filtering circuit, and a clamping circuit. The bridge switching circuit is switched on or off based on a control of the at least one PWM signal, and the at least one PWM signal is generated by the controller. The resonant and transforming circuit is coupled to the bridge switching circuit and has at least one resonant capacitor that is charged or discharged in response to switching of the bridge switching circuit. The rectifying and filtering circuit is coupled to the resonant and transforming circuit and the load. Besides, the rectifying and filtering circuit is configured to rectify and filter an output of the resonant and transforming circuit, and accordingly the rectifying and filtering circuit generates a driving voltage. The clamping circuit is coupled to the resonant and transforming circuit and configured to clamp a voltage across the at least one resonant capacitor within a range of a first voltage.

A controlling method of a resonant power conversion apparatus described in an embodiment of the invention includes following steps: controlling switching of a resonant converter, such that the resonant converter converts power and supplies the power to a load; detecting a driving state of the load; enabling one of a voltage control loop and a current control loop of a controller according to a result of detecting the driving state to adjust a switching frequency of the resonant converter.

According to an embodiment of the invention, the step of detecting the driving state of the load includes: detecting a load current that flows through the load and a driving voltage that is applied to the load.

According to an embodiment of the invention, the step of enabling one of the voltage control loop and the current control loop according to the result of detecting the driving state to adjust the switching frequency of the resonant converter includes: determining whether the load current is greater than or equal to a predetermined current; if the load current is smaller than the predetermined current, enabling the voltage control loop to adjust the switching frequency of the resonant converter according to the driving voltage; if the load current is larger than or equal to the predetermined current, enabling the current control loop to adjust the switching frequency of the resonant converter according to the load current.

According to an embodiment of the invention, the step of adjusting the switching frequency of the resonant converter according to the driving voltage includes: comparing the driving voltage with a reference voltage and generating a voltage error signal according to a result of comparing the driving voltage with the reference voltage; regulating the voltage error signal and accordingly generating a first regulating signal; applying the first regulating signal as a control signal and generating a switching frequency signal according to the control signal. Here, a frequency of the switching frequency signal is associated with the switching frequency of the resonant converter.

According to an embodiment of the invention, the step of adjusting the switching frequency of the resonant converter according to the load current includes: comparing the load current with a reference current and generating a current error signal according to a result of comparing the load current with the reference current; regulating the current error signal and accordingly generating a second regulating signal; applying the second regulating signal as a control signal and generating a switching frequency signal according to the control signal. Here, a frequency of the switching frequency signal is associated with the switching frequency of the resonant converter.

According to an embodiment of the invention, the step of adjusting the switching frequency of the resonant converter according to the driving voltage or the load current further includes: generating at least one pulse width modulation (PWM) signal according to the switching frequency signal and controlling the switching of the resonant converter according to the at least one PWM signal.

In view of the above, a resonant power conversion apparatus and a control method of the resonant power conversion apparatus are provided herein. The resonant power conversion apparatus is able to detect whether the over-current phenomenon occurs to the load and accordingly enables the voltage feedback control mechanism or the current feed back control mechanism to control the switching frequency of the resonant converter. Thereby, the resonant power conversion apparatus in a normal work state is capable of stably supplying power and limiting the current that flows through the load while the over-current phenomenon occurs to the load.

Several exemplary embodiments accompanied with figures are described in detail below to further describe the invention in details.

DETAILED DESCRIPTION OF DISCLOSED EMBODIMENTS

Figure 1:
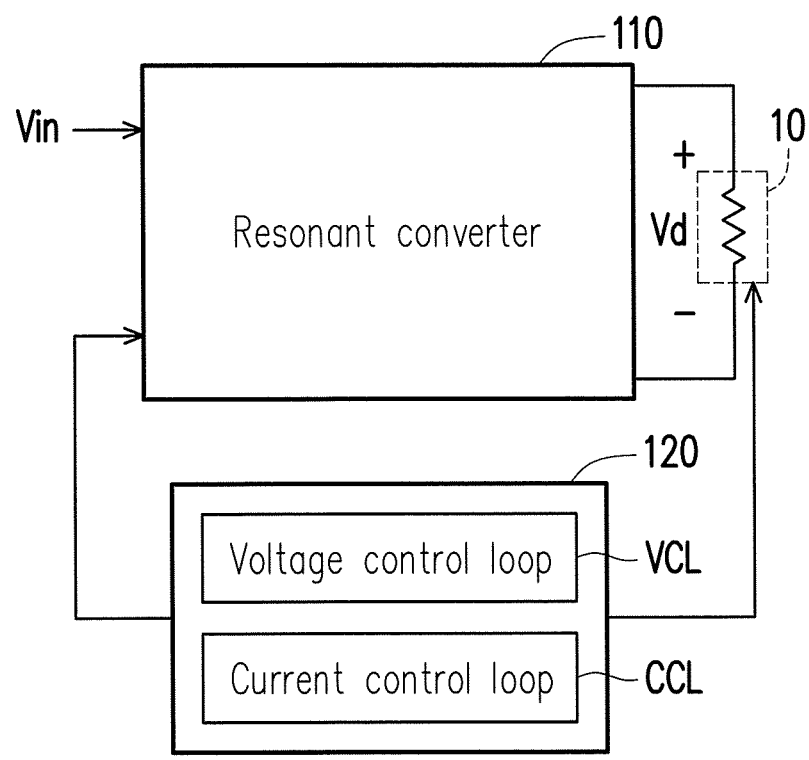
FIG. 1 is a schematic functional block diagram of a resonant power conversion apparatus according to an embodiment of the invention.

A resonant power conversion apparatus and a control method of the resonant power conversion apparatus are provided herein. The resonant power conversion apparatus may alternatively enable a voltage control loop (characterized by a reverse frequency regulating mechanism) or a current control loop (characterized by a forward frequency regulating mechanism) to control a switching frequency of a resonant converter. Since the current control loop described herein limits the current flowing through the load by a manner of reducing the switching frequency, the conventional issue of the switching loss caused by raising the switching frequency for limiting the current flowing through the load may be resolved. In order to make the invention more comprehensible, embodiments are described below as examples to prove that the invention can actually be realized. Moreover, elements/components/steps with same reference numerals represent same or similar parts in the drawings and embodiments.

FIG. 1 is a schematic functional block diagram of a resonant power conversion apparatus according to an embodiment of the invention. With reference to FIG. 1, the resonant power conversion apparatus 100 is a direct current to direct current (DC-DC) conversion power supply apparatus and includes a switch-based resonant converter 110 and a controller 120.

The switch-based resonant converter 110 may perform the power conversion on the DC input voltage Vin and accordingly generate the driving voltage Vd, so as to supply power to a load 10. In the present embodiment, the switch-based resonant converter 110 may have different circuit configurations, e.g., an asymmetrical half-bridge circuit, a symmetrical half-bridge circuit, a full-bridge switching circuit, and so forth, which should however not be construed as limitations to the invention.

The controller 120 is coupled to the resonant converter 110 and the load 10 and configured to control switching of the resonant converter 110 to regulate power conversion of the resonant converter 110. In the present embodiment, the controller 120 may be implemented in form of a digital controller or an analog controller, and the invention is not limited thereto.

Specifically, the controller 120 has a voltage control loop VCL and a current control loop CCL. The controller 120 detects a driving state of the load 10 (e.g., detects a driving voltage Vd applied to the load 10 and a load current Io flowing through the load 10), and enables one of the voltage control loop VCL and the current control loop CCL according to a result of detecting the driving state of the load 10 to adjust a switching frequency of the resonant converter 110.

Based on the detected current load Io, the controller 120 described herein is able to determine whether an over-current phenomenon occurs to the load 10 and thereby determine the corresponding control manner, such that the current flowing through the load 10 may be limited while the over-current phenomenon occurs to the load 10.

In detail, if the controller 120 detects that the load current Io is smaller than a predetermined current, the controller 120 determines that no over-current phenomenon occurs to the load 10 (i.e., the resonant power conversion apparatus 100 works as normal). At this time, the controller 120 enables the voltage control loop VCL to perform feedback control according to the driving voltage Vd and accordingly adjusts the switching frequency of the resonant converter 110. The controller 120 thus controls the switching frequency of the resonant converter 110 according to a difference between the driving voltage Vd and a reference voltage, so as to activate the reverse frequency regulating mechanism (i.e., the controller 120 may reduce the driving voltage Vd by raising the switching frequency). Thereby, power can be stably supplied to the load 10.

By contrast, if the controller 120 detects that the load current Io is larger than or equal to the predetermined current, the controller 120 determines that the over-current phenomenon occurs to the load 10. At this time, the controller 120 enables the current control loop CCL to perform feedback control according to the load current Io and accordingly adjusts the switching frequency of the resonant converter 110. The controller 120 thus controls the switching frequency of the resonant converter 110 according to a difference between the load current Io and a reference current, so as to activate the forward frequency regulating mechanism (i.e., the controller 120 may reduce the load current Io by lowering the switching frequency). Thereby, the current flowing through the load 10 may be limited. Namely, when the current control loop CCL is enabled, the controller 120 lowers the switching frequency of the resonant converter 110 in response to an increase in the load current Io.

Figure 2:
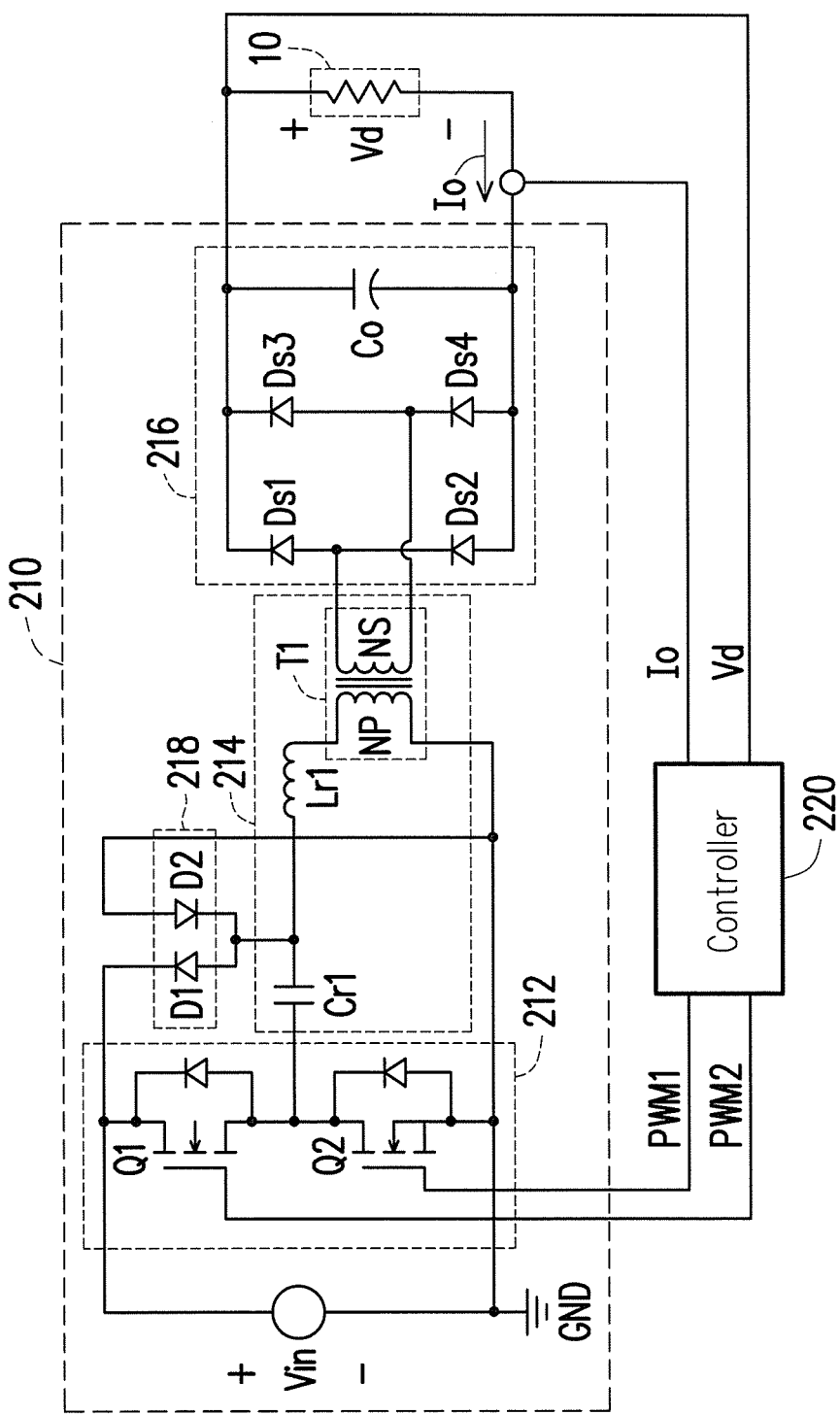
FIG. 2 is a schematic diagram illustrating circuitry of a resonant power conversion apparatus according to an embodiment of the invention.

To clearly illustrate the invention, please refer to FIG. 2. Specifically, FIG. 2 is a schematic diagram illustrating circuitry of a resonant power conversion apparatus according to an embodiment of the invention. As shown in FIG. 2, the resonant power conversion apparatus 200 includes a resonant converter 210 and a controller 220. The resonant converter 210 includes a bridge switching circuit 212, a resonant and transforming circuit 214, a rectifying and filtering circuit 26, and a clamping circuit 218. For illustrative purposes, the resonant converter 210 described in the present embodiment may have an asymmetrical half-bridge circuit, which should however not be construed as a limitation to the invention.

The bridge switching circuit 212 includes switch transistors Q1 and Q2, for instance. The switch transistors Q1 and Q2 are serially connected to constitute a bridge arm. Besides, the switch transistors Q1 and Q2 respectively controlled by pulse width modulation (PWM) signals PWM1 and PWM2 output by the controller 220 are alternatively turned on or off in a complementary/switching manner, so as to provide the DC input voltage Vin to the resonant and transforming circuit 214. Here, the switching frequency of the resonant converter 210 is the switching frequency of the bridge switching circuit 212 (the switch transistors Q1 and Q2), i.e., the switching frequency of the PWM signals PWM1 and PWM2. In the present embodiment, the switch transistors Q1 and Q2 are n-type power transistors, for instance, while the invention is not limited thereto.

The resonant and transforming circuit 214 includes a resonant capacitor Cr, a resonant inductor Lr, and a transformer T1, for instance. One terminal of a resonant capacitor Cr is coupled to the common node of the switch transistors Q1 and Q2; the resonant inductor Lr is coupled between the other terminal of the resonant capacitor Cr and a common-polarity terminal (i.e., a dotted terminal) of a primary winding NP of the transformer T1, and an opposite-polarity terminal (i.e., a non-dotted terminal) of the primary winding NP of the transformer T1 is grounded. Here, the resonant capacitor Cr and the resonant inductor Lr constitute a resonant circuit, and the serial resonant circuit is charged and discharged in response to the switching of the switch transistors Q1 and Q2. It should be mentioned that the resonant circuit constituted by the resonant capacitor Cr and the resonant inductor Lr is a serial resonant circuit (SRC) structure in the present embodiment. However, in other embodiments of the invention, the resonant circuit may be a parallel resonant circuit (PRC) or a serial-parallel resonant circuit (SPRC); that is, the structure of the resonant circuit may be determined according to actual design or application requirements.

The rectifying and filtering circuit 216 has a circuit structure including diodes Ds1 to Ds4 and a filter capacitor Co, for instance. The diodes Ds1 to Ds4 constitute a full-bridge rectifier. Two input terminals of the full-bridge rectifier (i.e., the anode terminals of the diodes Ds1 and Ds3) are respectively coupled to a common-polarity terminal and an opposite-polarity terminal of a secondary winding NS of the transformer T1, so as to rectify the output of the transformer T1 and accordingly generate the driving voltage Vd. The filter capacitor Co is connected to two terminals of load 10 in parallel and is configured to filter the non-DC part of the driving voltage Vd, such that power can be constantly and stably supplied to the load 10. In the present embodiment, the rectifying and filtering circuit 216 may have the circuit structure of the full-bridge rectifier constituted by the diodes Ds1 to Ds4, while the invention is not limited thereto. In other embodiments, the rectifying and filtering circuit 216 may also have the synchronous rectifier (SR) that is constituted by power transistors and serves to replace the diode Ds1 to Ds4 respectively, so as to form a self-driven or externally-driven synchronous rectifying circuit. The resultant circuit structure of the rectifying and filtering circuit 216 is determined according to actual design or application requirements.

The clamping circuit 218 has a circuit structure including clamping diodes D1 and D2, for instance. A cathode terminal and an anode terminal of the clamping diode D1 are respectively coupled to the drain of the switch transistor Q1 and the other terminal of the resonant capacitor Cr1. A cathode terminal and an anode terminal of the clamping diode D2 are respectively coupled between the anode terminal of the clamping diode D1 and the ground terminal GND.

Based on the circuit configuration of the resonant converter 210, the clamping circuit 218 is able to limit the cross voltage across the resonant capacitor Cr1 within a certain voltage range, so as to limit the current flowing through the load 10 while the over-current phenomenon occurs to the load 10. In better detail, in case that the over-current phenomenon occurs to the load 10, the clamping circuit 218 clamps the cross voltage across the resonant capacitor Cr1 at the voltage level of the DC input voltage Vin. Accordingly, the clamping circuit 218 is able to limit the energy stored in the resonant capacitor Cr1, so as to reduce the energy transmitted from the resonant circuit to the secondary side, and further limit the current flowing through the load 10 for achieving the over-current protection.

However, simply using the clamping circuit 218 to limit the current flowing through the load 10 may be insufficient, and the current limitation by the clamping circuit 218 cannot perform control directly to the amount of the load current Io. Besides, based on the circuit configuration of the resonant converter 210, the current limiting control mechanism by raising the switching frequency according to the related art cannot further enhance the over-current protection.

Specifically, in the resonant converter 210, the power transmitted from the primary side circuit to the secondary side circuit may be represented by P=W/T, wherein P refers to the transmitted power, W refers to the transmitted energy of the resonant circuit, and T refers to the switching cycle. According to said equation, although the increase in the switching frequency allows the impedance of the resonant circuit to be increased and allows the transmitted power P to be reduced, the increase in the switching frequency indicates the reduction of the switching cycle T. Hence, the transmitted power P is not significantly reduced, and the purpose of limiting the current cannot be further accomplished.

By contrast, the controller 220 described in the present embodiment may enable the voltage control loop before the over-current phenomenon occurs to the load 10, so as to ensure the stable and constant power supply from the resonant converter 210. In addition, if the over-current phenomenon occurs to the load 10, the controller 220 described herein may enable the current control loop to regulate the switching frequency of the bridge switching circuit 212 in a forward manner; that is, the switching cycle T may be lengthened by lowering the switching frequency of the bridge switching circuit 212, such that the power P may be reduced due to the lengthened switching cycle T, and that the current flowing through the secondary side circuit is reduced for enhancing the current limitation.

Moreover, the current flowing through the load 10 is limited by lowering the switching frequency according to the present embodiment; hence, compared to the conventional current limiting method, which reduces the current flowing through the secondary side circuit by raising the switching frequency, the control method described in the present embodiment allows the overall switching loss of the resonant power conversion apparatus 200 to be significantly reduced.

Figure 3:
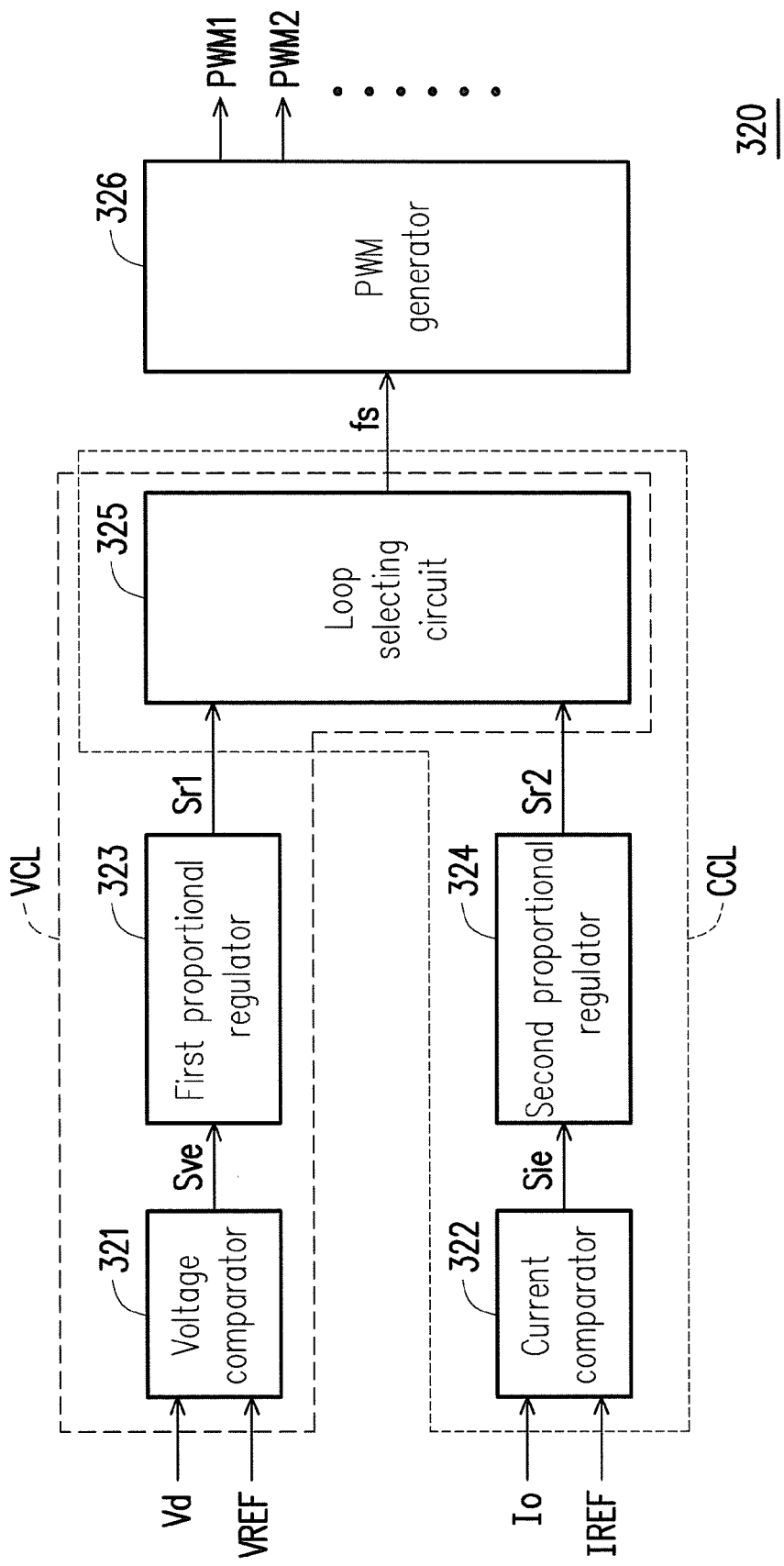
FIG. 3 is a schematic functional block diagram of a controller according to an embodiment of the invention.

FIG. 3 is a schematic functional block diagram of a controller according to an embodiment of the invention. With reference to FIG. 3, the controller 320 can be applied in either the resonant power conversion apparatus 100 or the resonant power conversion apparatus 200. The controller 320 includes a voltage comparator 321, a current comparator 322, a first proportional regulator 323, a second proportional regulator 324, a loop selecting circuit 325, and a PWM generator 326. The voltage comparator 321, the first proportional regulator 323, and the loop selecting circuit 325 constitute the voltage control loop VCL; the current comparator 322, the second proportional regulator 324, and the loop selecting circuit 325 constitute the current control loop CCL.

The voltage comparator 321 compares the driving voltage Vd with a reference voltage VREF and generates a voltage error signal Sve according to a result of comparing the driving voltage Vd with the reference voltage VREF. Here, the voltage error signal Sve is a difference between the driving voltage Vd and the reference voltage VREF; in the present embodiment, the voltage error signal Sve is defined as Sve=VREF−Vd. The first proportional regulator 323 is coupled to the voltage comparator 321 and configured to receive and regulate the voltage error signal Sve and accordingly generate a first regulating signal Sr1. The current comparator 322 compares the load current Io with a reference current IREF and generates a current error signal Sie according to a result of comparing the load current Io with the reference current IREF. Here, the current error signal Sie is a difference between the load current Io and the reference current IREF; in the present embodiment, the current error signal Sie is defined as Sie=Io−IREF. The second proportional regulator 324 is coupled to the current comparator 322 and configured to receive and regulate the current error signal Sie and accordingly generate a second regulating signal Sr2. Note that the first proportional regulator 323 and the second proportional regulator 324 may perform proportional-integral (PI) regulation, proportional-integral-derivative (PID) regulation, or any other closed-loop regulation, and the invention is not limited thereto.

The loop selecting circuit 325 is coupled to the first proportional regulator 323 and the second proportional regulator 324. Besides, the loop selecting circuit 325 may, based on the driving state of the load, generate a switching frequency signal fs according to one of the first regulating signal Sr1 and the second regulating signal Sr2. That is, if the loop selecting circuit 325 selects to generate the switching frequency signal fs according to the first regulating signal Sr1, it indicates that the controller 320 enables the voltage control loop VCL; if the loop selecting circuit 325 selects to generate the switching frequency signal fs according to the second regulating signal Sr2, it indicates that the controller 320 enables the current control loop CCL.

The PWM generator 326 is coupled to the loop selecting circuit 325 to receive the switching frequency signal fs. Besides, the PWM generator 326 is configured to control the switching of the resonant converter (e.g., the resonant converter 110 or the resonant converter 210) through generating at least one PWM signal (e.g., PWM1, PWM2, . . . , and so forth) according to the signal frequency of the switching frequency signal fs. Namely, the signal frequency of the PWM signal (e.g., PWM1, PWM2, . . . , and so forth) is synchronized with the signal frequency of the switching frequency signal fs.

Based on said configuration, the controller 320 merely requires an over-current determining signal that indicates whether the over-current phenomenon occurs to the load for controlling the switching of the loop selecting circuit LSC, and thereby the controller 320 is able to activate the control mechanism, i.e., enabling the voltage control loop VCL while the resonant power conversion apparatus functions in a normal manner and enabling the current control loop CCL while the over-current phenomenon occurs to the load. Here, the over-current determining signal may be generated by the over-current determining circuit constituted by a current sampling circuit and a comparator.

It should be mentioned that an amplitude limiting circuit (not shown in FIG. 3) may be arranged between the loop selecting circuit 325 and the proportional regulators 323 and 324, such that the loop selecting circuit 325 may generate the frequency signal fs according to the first regulating signal Sr1 or the second regulating signal Sr2 after the amplitude of the first regulating signal Sr1 or the amplitude of the second regulating signal Sr2 is limited, and thereby the resonant converter may stably perform the control mechanism. Whether or not the amplitude limiting circuit is arranged in the resonant power conversion apparatus may be determined according to actual design requirements and should not be construed as a limitation to the invention.

The detailed structure of the controller is exemplified in the following embodiments with reference to FIG. 4 to FIG. 7. The PWM generator in the controller shown in FIG. 4 to FIG. 7 is the same as that provided in the embodiment shown in FIG. 3 and thus will not be further explained. For illustrative purposes, FIG. 4 to FIG. 7 depict the voltage control loop and the current control loop.

Figure 4:
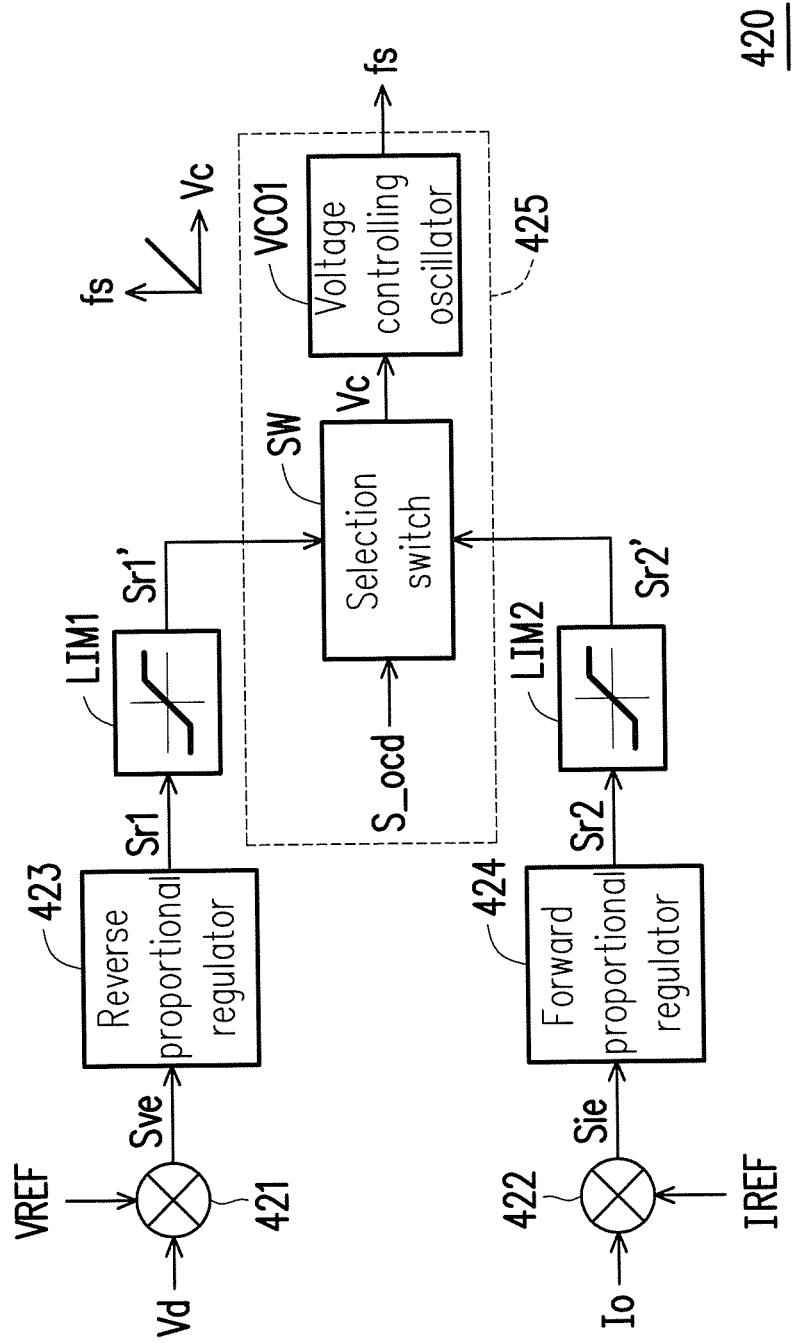
FIG. 4 to FIG. 7 are schematic diagrams illustrating the controller depicted in FIG. 3 according to several different embodiments of the invention.

With reference to FIG. 4, the controller 420 includes a voltage comparator 421, a current comparator 422, a forward proportional regulator 423, a reverse proportional regulator 424, a first amplitude limiting circuit LIM1, a second amplitude limiting circuit LIM2, and a loop selecting circuit 425. Here, the loop selecting circuit 425 includes a selection switch SW and a voltage controlling oscillator VCO1.

In the embodiment, the voltage comparator 421, the forward proportional regulator 423, the first amplitude limiting circuit LIM1, the selection switch SW, and the voltage controlling oscillator VCO1 constitute a voltage control loop (e.g., the voltage control loop VCL). Besides, the current comparator 422, the reverse proportional regulator 424, the second amplitude limiting circuit LIM2, the selection switch SW, and the voltage controlling oscillator VCO1 constitute a current control loop (e.g., the current control loop CCL). The selection switch SW is coupled between the voltage controlling oscillator VCO1 and the first and second amplitude limiting circuits LIM1 and LIM2.

If the controller 420 determines that no over-current phenomenon occurs to the load, the selection switch SW is controlled by an over-current determining signal S_ocd and accordingly switches on the signal path from the first amplitude limiting circuit LIM1 to the voltage controlling oscillator VCO1. Namely, the controller 420 enables the voltage control loop at this time.

While the voltage control loop is being enabled, the forward proportional regulator 423 performs the forward proportional regulation based on the voltage error signal Sve that is associated with the difference between the driving voltage Vd and the reference voltage VREF (the difference herein is obtained by subtracting the driving voltage Vd from the reference voltage VREF) and accordingly generates the first regulating signal Sr1; that is, the value of the first regulating signal Sr1 is positively related to the difference between the driving voltage Vd and the reference voltage VREF. The first amplitude limiting circuit LIM1 then limits the amplitude of the first regulating signal Sr1 and applies the first regulating signal Sr1' (whose amplitude is limited) as the control signal Vc of the voltage controlling oscillator VCO. The voltage controlling oscillator VCO may, based on the control signal Vc, generate the switching frequency signal fs, which corresponding to signal frequency.

By contrast, if the controller 420 determines that the overcurrent phenomenon occurs to the load, the selection switch SW is controlled by the over-current determining signal S_ocd and accordingly switches on the signal path from the second amplitude limiting circuit LIM2 to the voltage controlling oscillator VCO1. Namely, the controller 420 enables the current control loop (e.g., the current control loop CCL) at this time.

While the current control loop is at enabled state, the reverse proportional regulator 424 performs the reverse proportional regulation based on the current error signal Sie that is associated with the difference between the load current Io and the reference current IREF (the difference herein is obtained by subtracting the reference voltage VREF from the load current Io) and accordingly generates the second regulating signal Sr2; that is, the value of the second regulating signal Sr2 is negatively related to the difference between the load current Io and the reference current IREF. The second amplitude limiting circuit LIM2 then limits the amplitude of the second regulating signal Sr2 and applies the second regulating signal Sr2', which's amplitude has been limited, as the control signal Vc of the voltage controlling oscillator VCO1. The voltage controlling oscillator VCO1 may, based on the control signal Vc, generate the switching frequency signal fs, which corresponding to signal frequency.

According to the present embodiment, the signal frequency of the switching frequency signal fs is in direct proportion to the value of the control signal Vc. Hence, while the voltage control loop is being enabled, if the driving voltage Vd is lower than the reference voltage VREF, the controller 420 correspondingly lowers the switching frequency of the resonant converter to raise the driving voltage Vd, such that the difference between the driving voltage Vd and the reference voltage VREF is reduced; on the contrary, if the driving voltage Vd is higher than the reference voltage VREF, the controller 420 correspondingly raises the switching frequency of the resonant converter to lower the driving voltage Vd, such that the difference between the driving voltage Vd and the reference voltage VREF is reduced as well. That is, the voltage control loop controls the switching of the resonant converter by using of the reverse frequency regulating mechanism, so as to maintain the driving voltage Vd to be around the reference voltage VREF by raising/lowering the switching frequency to lower/raise the driving voltage Vd.

Hence, while the current control loop is at the enabled state, if the load current Io is higher than the reference current IREF, the controller 420 correspondingly lowers the switching frequency of the resonant converter to reduce the load current Io, such that the difference between the load current Io and the reference current IREF is reduced; on the contrary, if the load current Io is lower than the reference current IREF, the controller 420 correspondingly raises the switching frequency of the resonant converter to increase the load current Io, such that the difference between the load current To and the reference current IREF is reduced as well. That is, the current control loop controls the switching of the resonant converter by using of the forward frequency regulating mechanism, so as to raise/lower the switching frequency to increase/reduce the load current Io.

Figure 5:
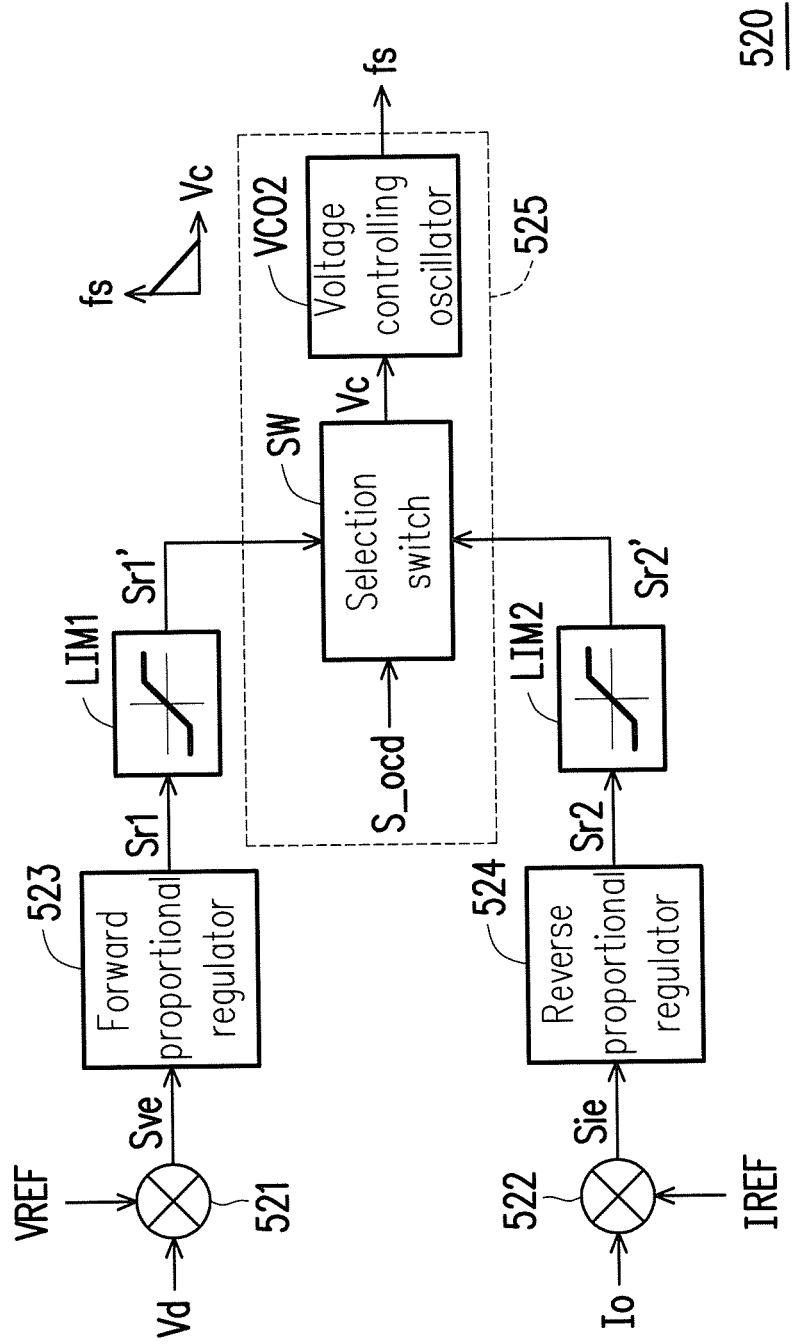

With reference to FIG. 5, the general structure of the controller 520 is similar to the controller 420. The difference between the controller 420 and the controller 520 lies in that the controller 520 performs the reverse regulation on the voltage error signal Sve by using of the reverse proportional regulator 523 and performs the forward regulation on the current error signal Sie by using of the forward proportional regulator 524. Besides, in the voltage controlling oscillator VCO2, the signal frequency is designed to be in an inverse proportion to the control signal Vc. Accordingly, the controller 520 controls the switching of the resonant converter in the same control manner as that of the controller 420.

Figure 6:
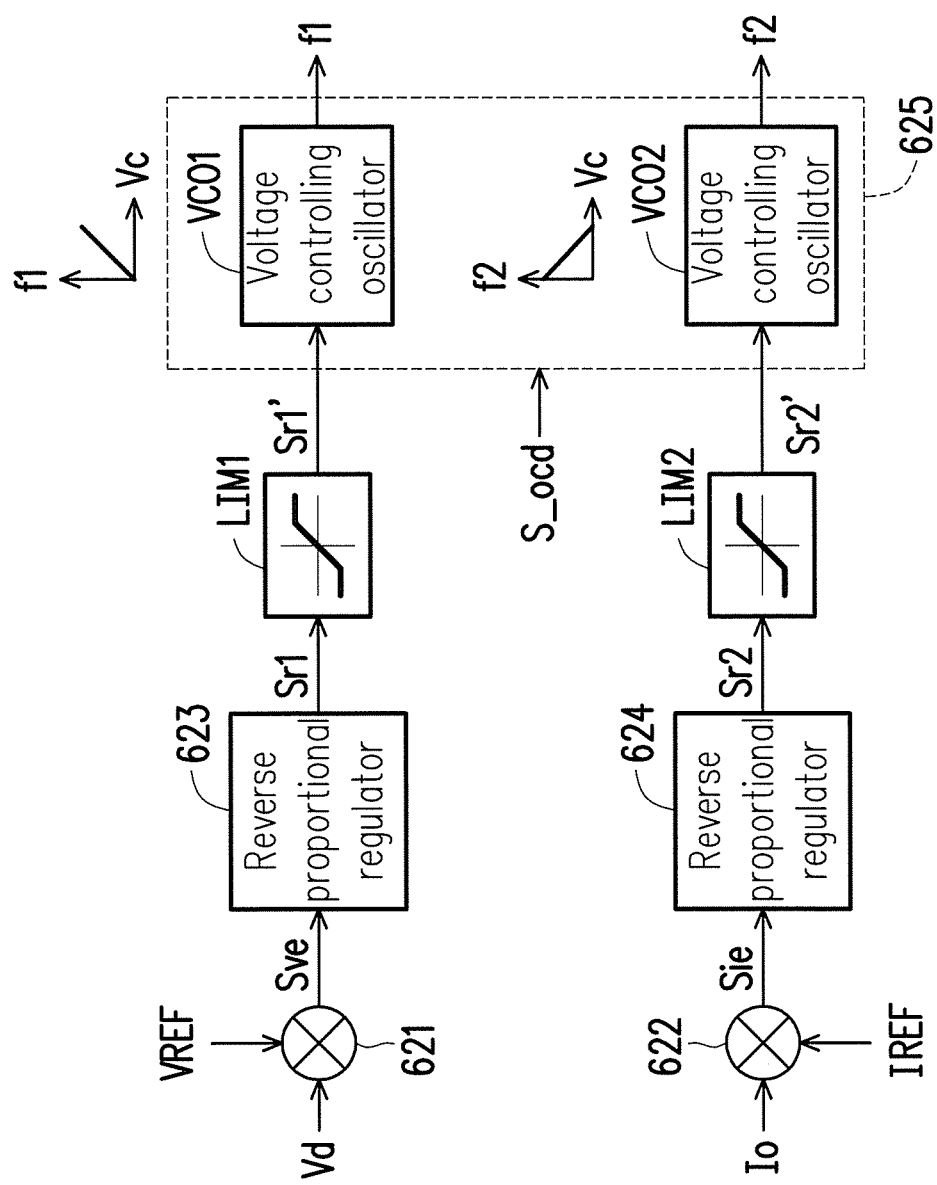

With reference to FIG. 6, the difference between the present and the previous embodiments disclosing the controller 420 shown in FIG. 4 and the controller 520 shown in FIG. 5 lies in that the control voltage loop and the current control loop in the controller 420 or 520 are constituted by sharing the selection switch (e.g., the selection switch SW) and the voltage controlling oscillator (e.g., the voltage controlling oscillator VCO1 or the voltage controlling oscillator VCO2), and that the control voltage loop and the current control loop in the controller 620 described in the present embodiment are respectively constituted by different voltage controlling oscillators VCO1 and VCO2.

For detail, in the controller 620, the voltage comparator 621, the forward proportional regulator 623, the first amplitude limiting circuit LIM1, and the voltage controlling oscillator VCO1 are sequentially coupled to constitute the voltage control loop. The current comparator 622, the forward proportional regulator 624, the second amplitude limiting circuit LIM2, and the voltage controlling oscillator VCO2 are sequentially coupled to constitute the current control loop. The voltage controlling oscillator VCO1 applies the first regulating signal Sr1' (whose amplitude is limited) as the control signal and accordingly generates a first frequency signal f1. The voltage controlling oscillator VCO2 applies the second regulating signal Sr2' (whose amplitude is limited) as the control signal and accordingly generates a second frequency signal f2. The loop selecting circuit 625 may, based on the over-current determining signal S_ocd, select one of the first frequency signal f1 and the second frequency signal f2 as the switching frequency signal for generating the PWM signal.

In the present embodiment, both the voltage control loop and the current control loop regulate signals by using of the forward proportional regulators 623 and 624, respectively; therefore, the voltage controlling oscillator in the voltage control loop is the voltage controlling oscillator VCO1 in which the signal frequency is in direct proportion to the control signal, and the voltage controlling oscillator in the current control loop is the voltage controlling oscillator VCO2 in which the signal frequency is in an inverse proportion to the control signal.

Figure 7:
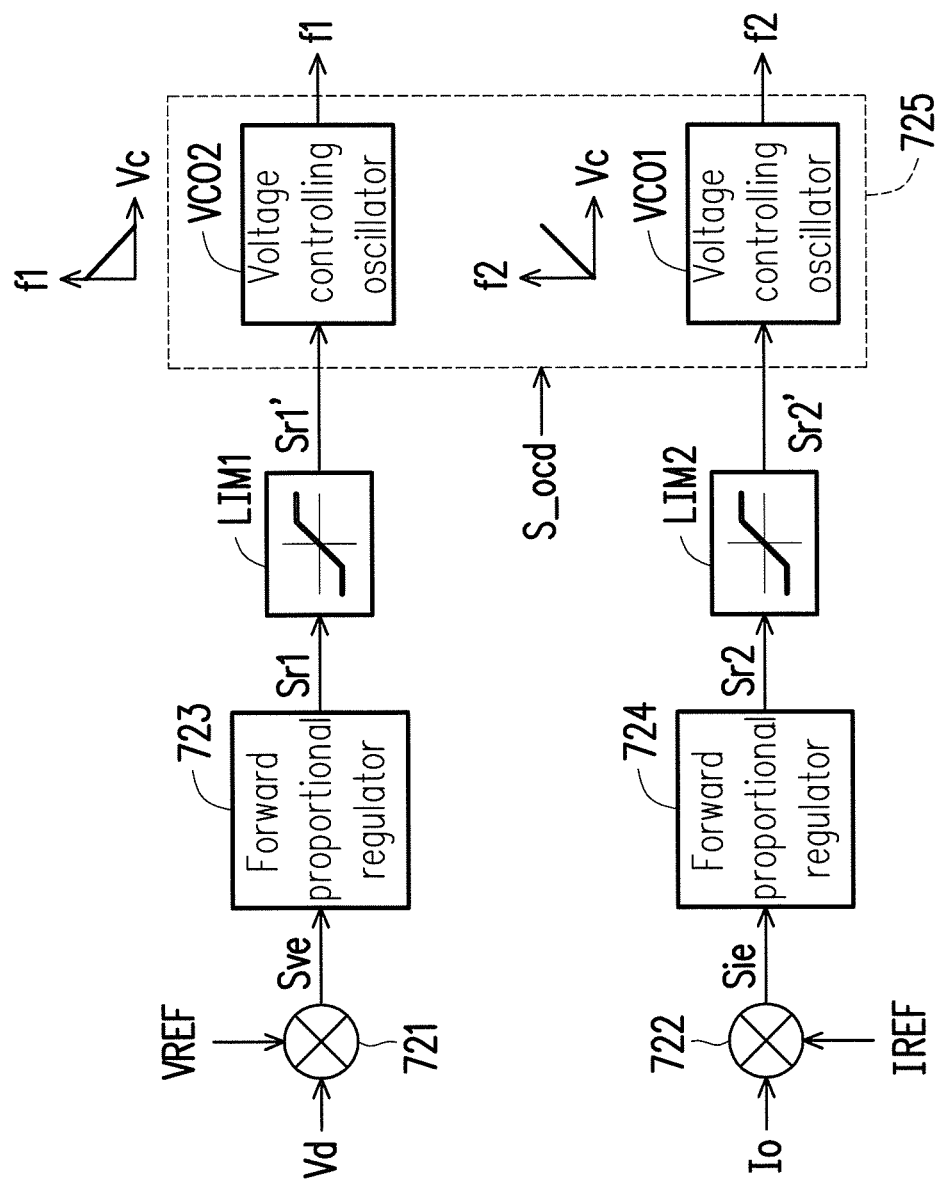

With reference to FIG. 7, the general structure of the controller 720 is substantially the same as the controller 620. The difference between the controllers 720 and 620 lies in that the controller 720 adopts the reverse proportional regulators 723 and 724 to respectively perform the reverse regulation on the voltage error signal Sve and the current error signal Sie; therefore, the voltage controlling oscillator in the voltage control loop is the voltage controlling oscillator VCO2 in which the signal frequency is in an inverse proportion to the control signal, and the voltage controlling oscillator in the current control loop is the voltage controlling oscillator VCO1 in which the signal frequency is in direct proportion to the control signal.

Accordingly, the controller 620 or the controller 720 can control the switching of the resonant converter in the same control manner as that of the controller 420 and the controller 520.

Additionally, based on the structure as shown in FIG. 6 and FIG. 7, it just needs to properly determine the corresponding relationship between the signal frequency and control signal in the voltage controlling oscillator, and then the proportional regulators in the voltage control loop and the current control loop may perform regulations in different directions. The invention is not limited thereto.

That is, regardless of the type of the proportional regulators in the voltage control loop and the current control loop, as long as the controller simultaneously includes the voltage control loop capable of performing the reverse frequency regulation mechanism and the current control loop capable of performing the forward frequency regulation mechanism, the controller does not depart from the scope of the invention.

Figure 8:
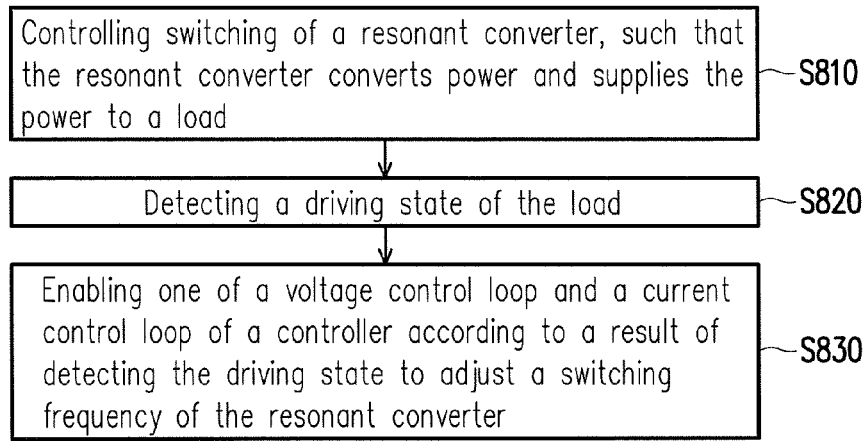
FIG. 8 is a flow chart of a control method of a resonant power conversion apparatus according to an embodiment of the invention.

FIG. 8 is a flow chart of a control method of a resonant power conversion apparatus according to an embodiment of the invention. The control method provided in the present embodiment is suitable for controlling resonant power conversion apparatuses 100 and 200 shown in FIG. 1 and FIG. 2, and the control method may be realized by using of any of the controllers 120, 220, 320, 420, 520, 620, and 720 respectively shown in FIG. 1 to FIG. 7. With reference to FIG. 8, the control method of a resonant power conversion apparatus described in the present embodiment of the invention includes following steps: controlling switching of a resonant converter (e.g., the resonant converter 110 or the resonant converter 210), such that the resonant converter converts power and supplies the power to a load (e.g., the load 10) (step S810); detecting a driving state of the load (step S820); enabling one of a voltage control loop (e.g., the voltage control loop VCL) and a current control loop (e.g., the current control loop CCL) of a controller according to a result of detecting the driving state to adjust a switching frequency of the resonant converter (step S830).

Figure 9:
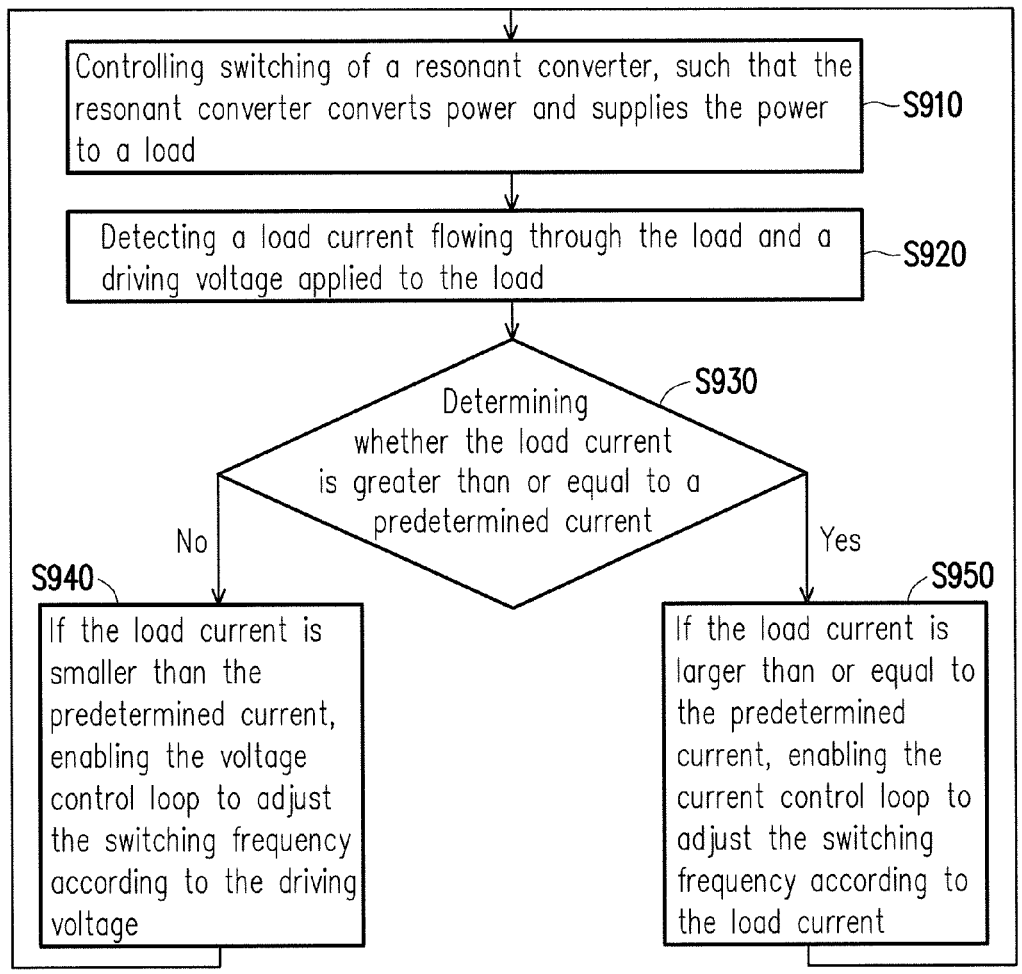
FIG. 9 is a flow chart of a control method of a resonant power conversion apparatus according to another embodiment of the invention.

In more detail, the control method depicted in FIG. 8 may be further implemented by performing steps shown in FIG. 9. FIG. 9 is a flow chart of a control method of a resonant power conversion apparatus according to another embodiment of the invention. With reference to FIG. 9, the control method of a resonant power conversion apparatus described in the present embodiment includes following steps: controlling the switching of a resonant converter, such that the resonant converter converts power and supplies the power to a load (e.g., the load 10) (step S910); detecting a load current flowing through the load and a driving voltage applied to the load (step S920); determining whether the load current is greater than or equal to a predetermined current (step S930); if the load current is smaller than the predetermined current, enabling the voltage control loop to adjust the switching frequency according to the driving voltage (step S940); if the load current is larger than or equal to the predetermined current, enabling the current control loop to adjust the switching frequency according to the load current (step S950).

According to the present embodiment, in step S940, the step of adjusting the switching frequency of the resonant converter according to the driving voltage includes: comparing the driving voltage with a reference voltage and generating a voltage error signal according to a result of comparing the driving voltage with the reference voltage; regulating the voltage error signal and accordingly generating a first regulating signal; applying the first regulating signal as a control signal and generating a switching frequency signal according to the control signal; generating at least one PWM signal according to the switching frequency signal; controlling the switching of the resonant converter according to the at least one PWM signal. Here, a frequency of the switching frequency signal is associated with the switching frequency of the resonant converter.

Besides, according to the present embodiment, in step S950, the step of adjusting the switching frequency of the resonant converter according to the load current includes: comparing the load current with a reference current and generating a current error signal according to a result of comparing the load current with the reference current; regulating the current error signal and accordingly generating a second regulating signal; applying the second regulating signal as a control signal and generating a switching frequency signal according to the control signal; generating at least one PWM signal according to the switching frequency signal; controlling the switching of the resonant converter according to the at least one PWM signal. Here, a frequency of the switching frequency signal is associated with the switching frequency of the resonant converter.

Sufficient written support and teachings of the control method depicted in FIG. 8 and FIG. 9 may be found in the above descriptions illustrated in FIG. 1 to FIG. 7, and thus similar or repetitive descriptions are not further provided hereinafter.

To sum up, a resonant power conversion apparatus and a control method of the resonant power conversion apparatus are provided herein. The resonant power conversion apparatus is able to detect whether the over-current phenomenon occurs to the load and accordingly enables the voltage control loop capable of performing the reverse frequency regulating mechanism or the current control loop capable of performing the forward frequency regulating mechanism to control the switching frequency of the resonant converter. Thereby, the resonant power conversion apparatus in a normal work state is capable of stably supplying power and limiting the current that flows to the load while the over-current phenomenon occurs to the load. Since the current control loop described herein limits the current flowing through the load by a manner of reducing the switching frequency, the conventional issue of the switching loss caused by raising the switching frequency for limiting the current flowing through the load may be resolved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A resonant power conversion apparatus comprising:
a switch-based resonant converter configured to supply power to a load; and
a controller coupled to the switch-based resonant converter and the load and configured to control switching of the switch-based resonant converter to regulate power conversion of the switch-based resonant converter,
wherein the controller has a voltage control loop and a current control loop, the controller detects a driving state of the load, and enables one of the voltage control loop and the current control loop according to a result of detecting the driving state of the load to adjust a switching frequency of the switch-based resonant converter,
wherein the controller detects a load current flowing through the load and a driving voltage applied to the load,
when the controller determines the load current is smaller than a predetermined current, the controller enables the voltage control loop to adjust the switching frequency according to the driving voltage, and
when the controller determines the load current is larger than or equal to the predetermined current, the controller enables the current control loop to adjust the switching frequency according to the load current.

2. The resonant power conversion apparatus as recited in claim 1, wherein
when the voltage control loop is enabled, the controller raises the switching frequency in response to an increase of the driving voltage, and
when the current control loop is enabled, the controller lowers the switching frequency in response to an increase of the load current.

3. The resonant power conversion apparatus as recited in claim 1, wherein the controller comprises:
a voltage comparator configured to compare the driving voltage with a reference voltage, the voltage comparator generating a voltage error signal according to a result of comparing the driving voltage with the reference voltage;
a first proportional regulator coupled to the voltage comparator, the first proportional regulator being configured to regulate the voltage error signal and accordingly generating a first regulating signal;
a current comparator configured to compare the load current with a reference current, the current comparator generating a current error signal according to a result of comparing the load current with the reference current;

a second proportional regulator coupled to the current comparator, the second proportional regulator being configured to regulate the current error signal and accordingly generating a second regulating signal; and a loop selecting circuit coupled to the first proportional regulator and the second proportional regulator and configured to generate a switching frequency signal according to one of the first regulating signal and the second regulating signal, wherein the voltage comparator, the first proportional regulator, and the loop selecting circuit constitute the voltage control loop, wherein the current comparator, the second proportional regulator, and the loop selecting circuit constitute the current control loop.

4. The resonant power conversion apparatus as recited in claim 3, wherein the loop selecting circuit comprises:

a selection switch coupled to the first proportional regulator and the second proportional regulator, the selection switch being controlled by an over-current determining signal to select one of the first regulating signal and the second regulating signal as a control signal, wherein the over-current determining signal is associated with a result of comparing the load current with the predetermined current;

a voltage controlling oscillator coupled to the selection switch, the voltage controlling oscillator receiving the control signal and accordingly generating the switching frequency signal, wherein a frequency of the switching frequency signal is associated with the switching frequency.

5. The resonant power conversion apparatus as recited in claim 3, wherein the loop selecting circuit comprises:

a first voltage controlling oscillator coupled to the first proportional regulator, the first voltage controlling oscillator receiving the first regulating signal and accordingly generating a first frequency signal; and a second voltage controlling oscillator coupled to the second proportional regulator, the second voltage controlling oscillator receiving the second regulating signal and accordingly generating a second frequency signal, wherein the loop selecting circuit selects one of the first frequency signal and the second frequency signal as the switching frequency signal according to an over-current determining signal, wherein the over-current determining signal is associated with a result of comparing the load current with the predetermined current.

6. The resonant power conversion apparatus as recited in claim 3, wherein the controller further comprises:

a first amplitude limiting circuit coupled between the first proportional regulator and the loop selecting circuit and configured to limit amplitude of the first regulating signal; and a second amplitude limiting circuit coupled between the second proportional regulator and the selection switch and configured to limit amplitude of the second regulating signal, wherein the loop selecting circuit generates the switching frequency signal according to one of the first regulating signal and the second regulating signal after the amplitude of the first regulating signal and the amplitude of the second regulating signal are limited.

7. The resonant power conversion apparatus as recited in claim 3, wherein the controller further comprises:

a pulse width modulation generator coupled to the loop selecting circuit and configured to control the switching of the switch-based resonant converter through generating at least one pulse width modulation signal according to the switching frequency signal.

8. The resonant power conversion apparatus as recited in claim 1, wherein the switch-based resonant converter comprises:

a bridge switching circuit being switched on or off based on a control of the at least one pulse width modulation signal, wherein the at least one pulse width modulation signal is generated by the controller;

a resonant and transforming circuit coupled to the bridge switching circuit, the resonant and transforming circuit having at least one resonant capacitor, the at least one resonant capacitor being charged or discharged in response to switching of the bridge switching circuit;

a rectifying and filtering circuit coupled to the resonant and transforming circuit and the load and configured to rectify and filter an output of the resonant and transforming circuit, the rectifying and filtering circuit accordingly generating a driving voltage; and a clamping circuit coupled to the resonant and transforming circuit and configured to clamp a voltage across the at least one resonant capacitor within a range of a first voltage.

9. A controlling method of a resonant power conversion apparatus, the resonant power conversion apparatus comprising a switch-based resonant converter and a controller, the controlling method comprising:

controlling switching of the switch-based resonant converter, such that the switch-based resonant converter converts power and supplies the power to a load;

detecting a driving state of the load by detecting a load current flowing through the load and a driving voltage applied to the load; and enabling one of a voltage control loop and a current control loop of the controller according to a result of detecting the driving state to adjust a switching frequency of the switch-based resonant converter by steps comprising:

determining whether the load current is greater than or equal to a predetermined current;

if the load current is smaller than the predetermined current, enabling the voltage control loop to adjust the switching frequency according to the driving voltage, and if the load current is larger than or equal to the predetermined current, enabling the current control loop to adjust the switching frequency according to the load current.

10. The controlling method as recited in claim 9, wherein when the voltage control loop is enabled, the controller raises the switching frequency in response to an increase of the driving voltage, and when the current control loop is enabled, the controller lowers the switching frequency in response to an increase of the load current.

11. The controlling method as recited in claim 9, wherein the step of adjusting the switching frequency of the switch-based resonant converter according to the driving voltage comprises:

comparing the driving voltage with a reference voltage and generating a voltage error signal according to a result of comparing the driving voltage with the reference voltage;

regulating the voltage error signal and accordingly generating a first regulating signal; and applying the first regulating signal as a control signal and generating a switching frequency signal according to the control signal, wherein a frequency of the switching frequency signal is associated with the switching frequency.

12. The controlling method as recited in claim 11, wherein the step of adjusting the switching frequency of the switch-based resonant converter according to the load current comprises:
   comparing the load current with a reference current and generating a current error signal according to a result of comparing the load current with the reference current;
   regulating the current error signal and accordingly generating a second regulating signal; and
   applying the second regulating signal as a control signal and generating a switching frequency signal according to the control signal, wherein a frequency of the switching frequency signal is associated with the switching frequency.

13. The controlling method as recited in claim 12, wherein the step of adjusting the switching frequency of the switch-based resonant converter according to the driving voltage or the load current further comprises:
   generating at least one pulse width modulation signal according to the switching frequency signal; and
   controlling the switching of the switch-based resonant converter according to the at least one pulse width modulation signal.

* * * * *